United States Patent
Dawson et al.

(10) Patent No.: US 7,873,019 B2
(45) Date of Patent: Jan. 18, 2011

(54) SYSTEMS AND METHODS FOR ESTABLISHING GATEWAY BANDWIDTH SHARING AD-HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US); Philip K. Mullins, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 11/755,780

(22) Filed: May 31, 2007

(65) Prior Publication Data

US 2008/0298327 A1   Dec. 4, 2008

(51) Int. Cl.
*G06F 17/30* (2006.01)

(52) U.S. Cl. .................. 370/338; 455/557; 455/433; 455/453

(58) Field of Classification Search .......... 370/310–350
See application file for complete search history.

(56) References Cited

U.S. PATENT DOCUMENTS

| | | | |
|---|---|---|---|
| 5,437,054 A | 7/1995 | Rappaport et al. | |
| 5,490,201 A | 2/1996 | Moberg et al. | |
| 6,006,084 A | 12/1999 | Miller et al. | |
| 6,035,281 A | 3/2000 | Crosskey et al. | |
| 6,047,268 A | 4/2000 | Bartoli et al. | |
| 6,366,907 B1 | 4/2002 | Fanning et al. | |
| 6,396,805 B2 | 5/2002 | Romrell | |
| 6,397,061 B1 | 5/2002 | Jordan et al. | |
| 6,522,735 B1 | 2/2003 | Fortman et al. | |
| 6,653,933 B2 | 11/2003 | Raschke et al. | |
| 6,751,196 B1 | 6/2004 | Hulyalkar et al. | |
| 6,763,248 B1 * | 7/2004 | Odamura | 455/557 |
| 6,810,428 B1 | 10/2004 | Larsen et al. | |
| 6,850,764 B1 | 2/2005 | Patel | |
| 6,941,378 B2 | 9/2005 | Apostolopoulos et al. | |

(Continued)

FOREIGN PATENT DOCUMENTS

| | | |
|---|---|---|
| EP | 0999662 | 5/2005 |
| WO | 9915960 | 4/1999 |
| WO | 03037009 | 5/2003 |
| WO | 04001585 | 12/2003 |
| WO | 2006004628 | 1/2006 |

OTHER PUBLICATIONS

D. Zhu et al., "QoS Aware Wireless Bandwidth Aggregation (QAWBA) by Integrating Cellular and Ad-hoc Networks."

(Continued)

*Primary Examiner*—Kent Chang
*Assistant Examiner*—Kashif Siddiqui
(74) *Attorney, Agent, or Firm*—William Schiesser; Roberts Mlotkowski Safran & Cole, P.C.

(57) ABSTRACT

Sytems and methods for establising gateway bandwidth sharing ad hoc networks. In a first aspect, a method includes establishing a relationship with a gateway that retrieves data from a remote location and divides the data into at least a first portion and a second portion. The method further includes establising an ad hoc network comprising at least one local lender, receiving the first portion from the gateway via the at least one local lender, receiving the second portion from the gateway, and joining the first portion and the second portion to re-create the data.

28 Claims, 12 Drawing Sheets

U.S. PATENT DOCUMENTS

| | | | |
|---|---|---|---|
| 6,954,616 B2 | 10/2005 | Liang et al. | |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 6,990,113 B1 | 1/2006 | Wang et al. | |
| 7,016,375 B1 | 3/2006 | Rosenberg et al. | |
| 7,028,096 B1 | 4/2006 | Lee | |
| 7,043,225 B1 | 5/2006 | Patel et al. | |
| 7,058,014 B2 | 6/2006 | Sim | |
| 7,058,387 B2 | 6/2006 | Kumar et al. | |
| 7,065,367 B2 | 6/2006 | Michaelis et al. | |
| 7,075,890 B2 | 7/2006 | Ozer et al. | |
| 7,089,301 B1 | 8/2006 | Labio et al. | |
| 7,130,283 B2 | 10/2006 | Vogel et al. | |
| 7,174,385 B2 | 2/2007 | Li | |
| 7,224,964 B2 | 5/2007 | Souissi et al. | |
| 7,240,015 B1 | 7/2007 | Karmouch et al. | |
| 7,257,632 B2 | 8/2007 | Zhang et al. | |
| 7,274,658 B2 | 9/2007 | Bornstein et al. | |
| 7,310,641 B2 | 12/2007 | Moore et al. | |
| 7,340,759 B1 | 3/2008 | Rodriguez | |
| 7,376,747 B2 | 5/2008 | Hartop | |
| 7,401,153 B2 | 7/2008 | Traversat et al. | |
| 7,440,573 B2 | 10/2008 | Lor et al. | |
| 7,447,656 B2 | 11/2008 | Parthasarathy | |
| 7,450,517 B2* | 11/2008 | Cho | 370/238 |
| 7,450,949 B2 | 11/2008 | Choksi | |
| 7,460,549 B1 | 12/2008 | Cardei et al. | |
| 7,463,890 B2 | 12/2008 | Herz | |
| 7,489,656 B2 | 2/2009 | Guo et al. | |
| 7,546,342 B2 | 6/2009 | Li et al. | |
| 7,593,333 B2 | 9/2009 | Li et al. | |
| 2001/0029182 A1 | 10/2001 | McCann et al. | |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0069278 A1 | 6/2002 | Forslöw | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1* | 9/2002 | Kulikov et al. | 370/349 |
| 2002/0141358 A1 | 10/2002 | Requena | |
| 2002/0145978 A1 | 10/2002 | Batsell et al. | |
| 2003/0068975 A1 | 4/2003 | Qiao et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0153338 A1 | 8/2003 | Herz et al. | |
| 2003/0235174 A1* | 12/2003 | Pichna et al. | 370/338 |
| 2004/0006621 A1 | 1/2004 | Bellinson et al. | |
| 2004/0029553 A1 | 2/2004 | Cain | |
| 2004/0064351 A1 | 4/2004 | Mikurak | |
| 2004/0128231 A1 | 7/2004 | Morita | |
| 2004/0156312 A1 | 8/2004 | Salonidis et al. | |
| 2004/0162871 A1 | 8/2004 | Pabla et al. | |
| 2004/0165548 A1* | 8/2004 | Backes | 370/328 |
| 2004/0185777 A1 | 9/2004 | Bryson | |
| 2004/0192204 A1 | 9/2004 | Periyalwar et al. | |
| 2004/0260808 A1 | 12/2004 | Strutt | |
| 2004/0264466 A1 | 12/2004 | Huang | |
| 2005/0080872 A1 | 4/2005 | Davis et al. | |
| 2005/0153725 A1 | 7/2005 | Naghian et al. | |
| 2005/0157661 A1* | 7/2005 | Cho | 370/254 |
| 2005/0169209 A1 | 8/2005 | Miu et al. | |
| 2005/0169257 A1 | 8/2005 | Lahetkangas et al. | |
| 2005/0193221 A1 | 9/2005 | Yoneyama | |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0085543 A1 | 4/2006 | Hrastar et al. | |
| 2006/0095582 A1 | 5/2006 | Nitya et al. | |
| 2006/0114853 A1* | 6/2006 | Hasty et al. | 370/329 |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0224502 A1 | 10/2006 | McGowan | |
| 2007/0005797 A1 | 1/2007 | Fontijn et al. | |
| 2007/0117537 A1 | 5/2007 | Hui et al. | |
| 2008/0008140 A1 | 1/2008 | Forssell | |
| 2008/0040481 A1 | 2/2008 | Joshi et al. | |
| 2008/0167982 A1 | 7/2008 | Leo et al. | |

OTHER PUBLICATIONS

D. Zhu et al., "Using Cooperative Multiple Paths to Reduce File Download Latency in Cellular Data Networks."
Non-final Office Action dated Dec. 23, 2008 in U.S. Appl. No. 11/755,806.
Final Office Action dated Jun. 3, 2009 in U.S. Appl. No. 11/755,806.
Final Office Action dated Jun. 9, 2009 in U.S. Appl. No. 11/755,806.
Non-final Office Action dated Nov. 25, 2009 in U.S. Appl. No. 11/755,802.
Non-final Office Action dated Oct. 19, 2009 in U.S. Appl. No. 11/755,788.
Qui et al., "Bandwidth in Ad Hoc Networks: A Price-Based Approach," 2003, IEEE, pp. 1-10.
Non-Final Office Action dated Mar. 4, 2010 in U.S. Appl. No. 11/755,775.
Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
Non-final Office Action dated Dec. 24, 2009 in U.S. Appl. No. 11/755,776.
Non-final Office Action dated Jan. 22, 2010 in U.S. Appl. No. 11/755,778.
Non-final Office Action dated Jan. 21, 2010 in U.S. Appl. No. 11/755,808.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Office Action dated Jun. 22, 2010 in U.S. Appl. No. 11/755,776.
Office Action dated Jul. 12, 2010 in U.S. Appl. No. 11/755,808.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Jul. 13, 2010 in U.S. Appl. No. 11/755,778.
Notice of Allowance dated Aug. 16, 2010 in U.S. Appl. No. 11/755,763.
Office Action dated Sep. 14, 2010 in U.S. Appl. No. 11/755,788.
Final Office Action dated Sep. 15, 2010 in U.S. Appl. No. 11/755,782.
Notice of Allowance dated Oct. 12, 2010 in U.S. Appl. No. 11/755,808.
Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.
Das et al, A Structured Channel Borrowing Scheme for Dynamic Load Balancing in Cellular Networks, IEEE, 8 pages, 1997.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

FIG. 4

SYSTEMS AND METHODS FOR ESTABLISHING GATEWAY BANDWIDTH SHARING AD-HOC NETWORKS

CROSS-REFERENCE TO RELATED APPLICATIONS

This application is related to the following copending applications, all of which are incorporated herein by reference in their entireties: Copending application Ser. No. 11/755,775; copending application Ser. No. 11/755,802; copending application Ser. No. 11/755,763; and copending application Ser. No. 11/755,808.

FIELD OF THE INVENTION

The invention generally relates to systems and methods for data transfer and, more particularly, to systems and methods for data transfer in gateway bandwidth sharing ad hoc networks.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11 g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises establishing a relationship with a gateway that retrieves data from a remote location and divides the data into at least a first portion and a second portion. The method further comprises establishing an ad hoc network comprising at least one local lender, receiving the first portion from the gateway via the at least one local lender, receiving the second portion from the gateway, and joining the first portion and the second portion to re-create the data.

In another aspect of the invention, a method comprises receiving a remote location for data and receiving an identity of at least one lender. The method further comprises downloading the data from the remote location, dividing the data into at least a first portion and a second portion, and transferring the first portion and the second portion separately to a borrower of an ad hoc network.

In another aspect of the invention, a method comprises providing a computer infrastructure operable to establish a relationship with a gateway device and establish an ad hoc network amongst local devices. The computer infrastructure is further operable to either receive a data file from a remote location via the gateway device and the local devices, or transmit a data file to a remote location via the local devices and the gateway device.

In another aspect of the invention, there is a computer program product comprising a computer usable medium having a computer readable program embodied in the medium. The computer readable program when executed on a computing device causes the computing device to establish a relationship between a borrower and a gateway device and establish an ad hoc network amongst local devices. The computer readable program when executed on a computing device further causes the computing device to receive a data file from a remote location via the gateway device and the local devices, or transmit a data file to a remote location via the local devices and the gateway device.

In another aspect of the invention, there is a system comprising a server having a database containing data associated with one or more lenders and a borrower in an ad-hoc network, and at least one of a hardware and software component configured to: establish a relationship between the borrower and a gateway device, and establish an ad hoc network amongst the borrower and the one or more lenders. The at least one of a hardware and software component is further configured to one of: receive a data file from a remote location via the gateway device and the one or more lenders, and transmit a data file to a remote location via the one or more lenders and the gateway device.

BRIEF DESCRIPTION OF THE DRAWINGS

FIG. 4 shows an example table created and used in implementing aspects of the invention.

DETAILED DESCRIPTION OF EMBODIMENTS OF THE INVENTION

The invention generally relates to systems and methods for data transfer and, more particularly, to systems and methods for data transfer in gateway bandwidth sharing ad hoc networks. The invention allows a device with a relatively low bandwidth (e.g., low rate of data transfer) to leverage the bandwidth of other local devices to create a virtual high bandwidth (e.g., high rate of data transfer) connection. In exemplary implementations of the invention, an ad hoc network of wireless devices is established for transferring data from a remote location to a member of the network via other members of the network. Alternatively, data may be transferred from a single member of the network to a remote location via the other members of the network. In this manner, data may be transferred (e.g., downloaded, uploaded, etc.) in a parallel fashion, instead of serial fashion, thereby improving the speed and efficiency of data transfer.

Figure 1:
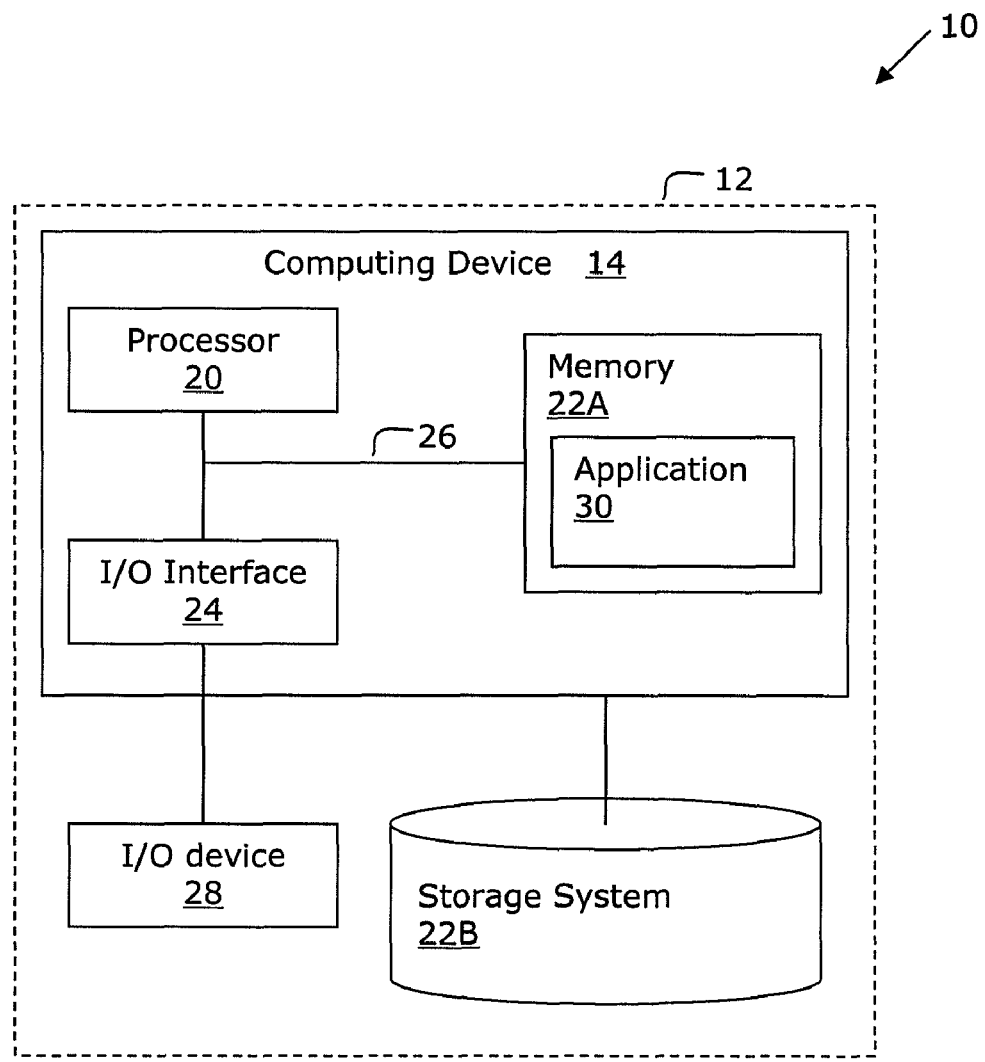
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, e.g., establish ad hoc networks, transfer data over ad hoc networks, etc. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview Of Embodiments

"Ad hoc" relationships will become increasingly important in the communal sharing of immediately available resources, and most particularly, the sharing of bandwidth. With the creation of peer-to-peer networks and torrent-type services, a file may be stored in more than one location to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is an IEEE 802.11g local area connection that creates a high-speed wireless connection between two cellular phone devices within close range, and wherein the cellular phones' cellular (e.g., wireless telephony) connection to remote locations provides bandwidth at less than $1/100^{th}$ of the local IEEE 802.11g connection.

The present invention is directed to systems and methods for transferring data using ad hoc networks in which a single member of the network may "borrow" bandwidth from other members of the network. The present invention provides gateway implementations of downloading data from, or uploading data to, a remote location or locations. Illustrative cases of data transfer to/from a remote location using peer-to-peer (P2P), non-gateway implementations are set forth in co-pending application Ser. No. 11/755,808.

Figure 2A:
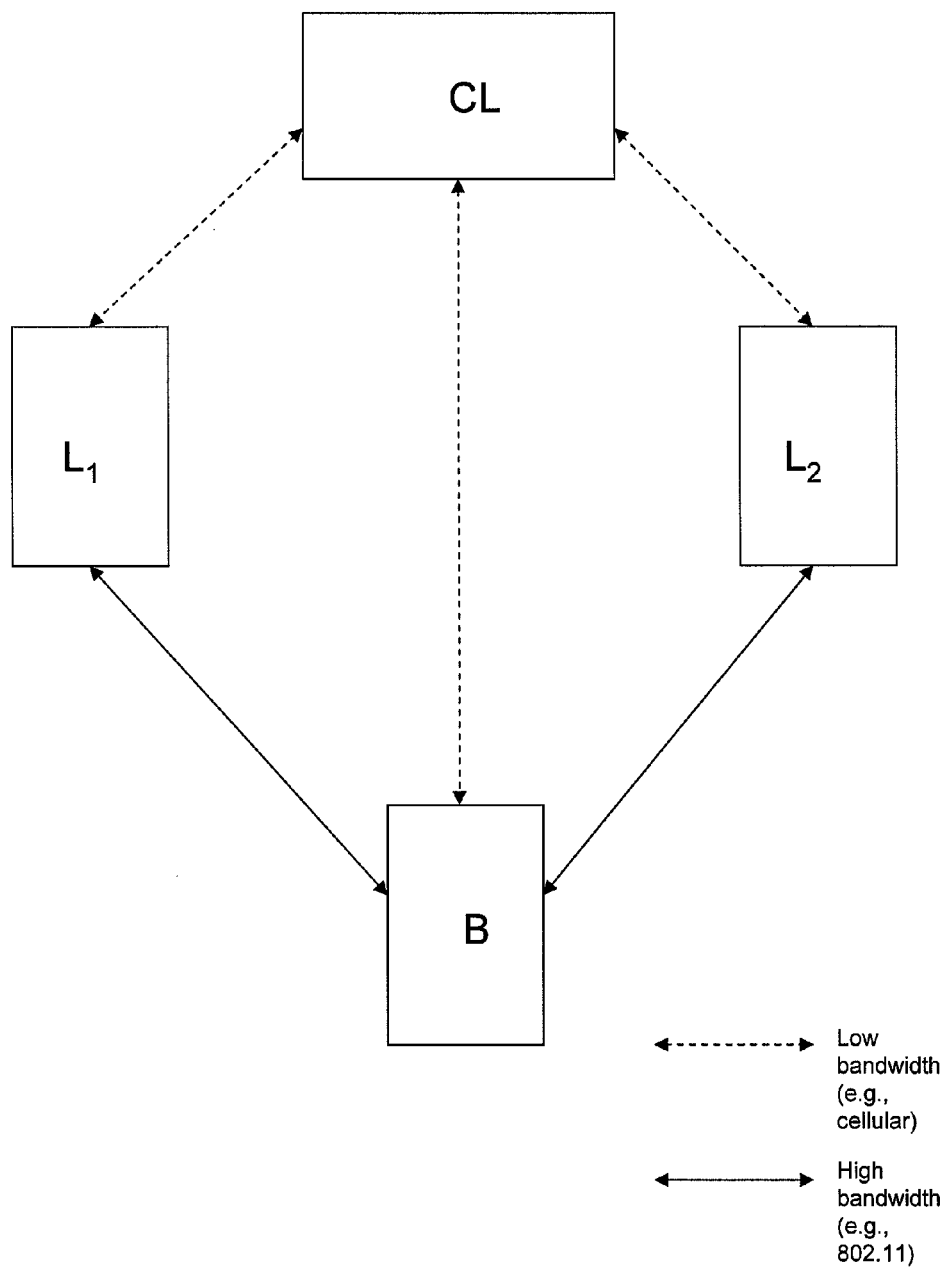
FIGS. 2A through 2D show peer-to-peer bandwidth-sharing ad hoc networks according to aspects of the invention.

FIGS. 2A through 2D show a general overview of a non-gateway, peer-to-peer (P2P) bandwidth sharing architecture. In these implementations, as shown in FIG. 2A, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess (e.g., currently unused) bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
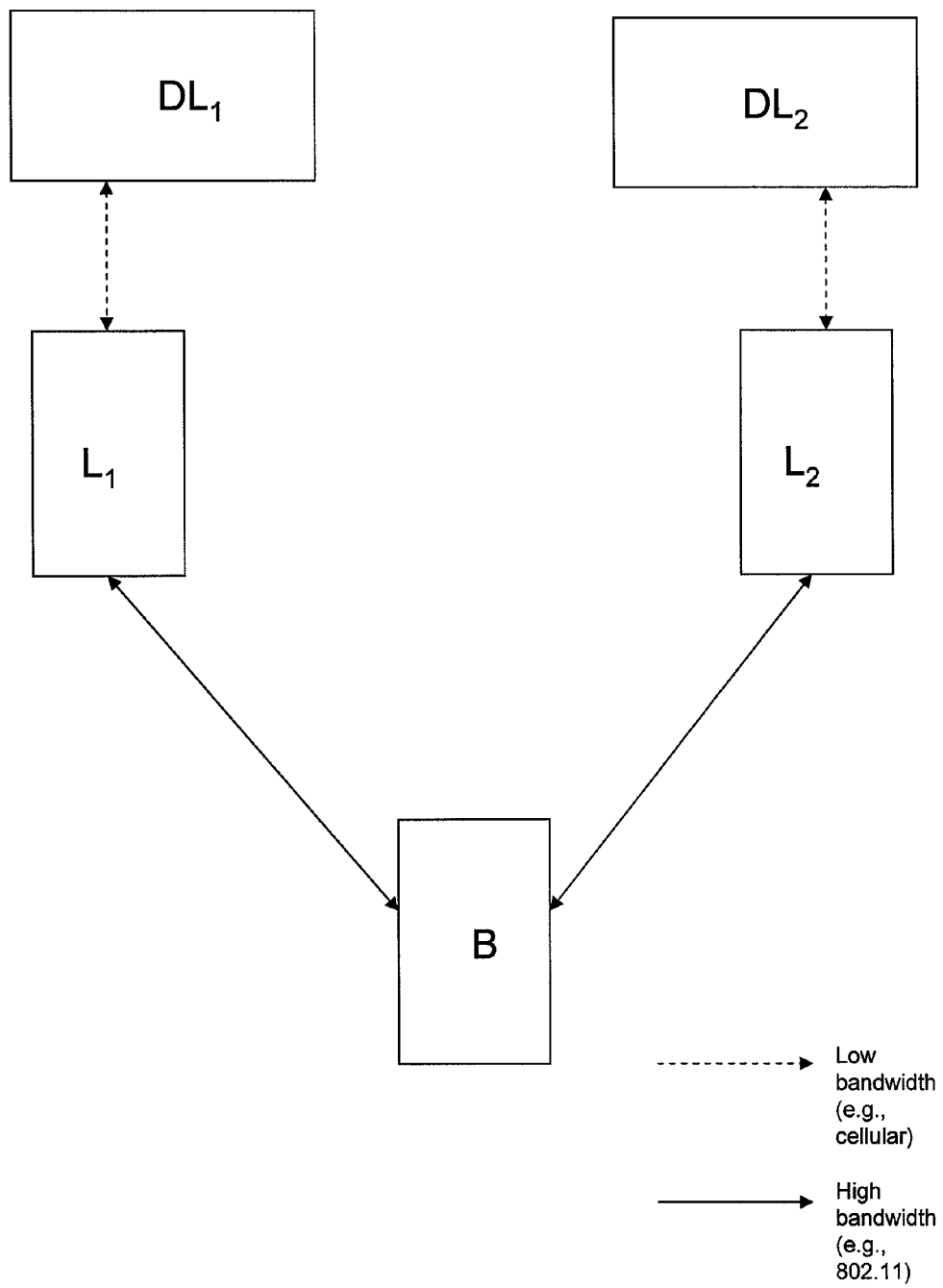

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 2C:
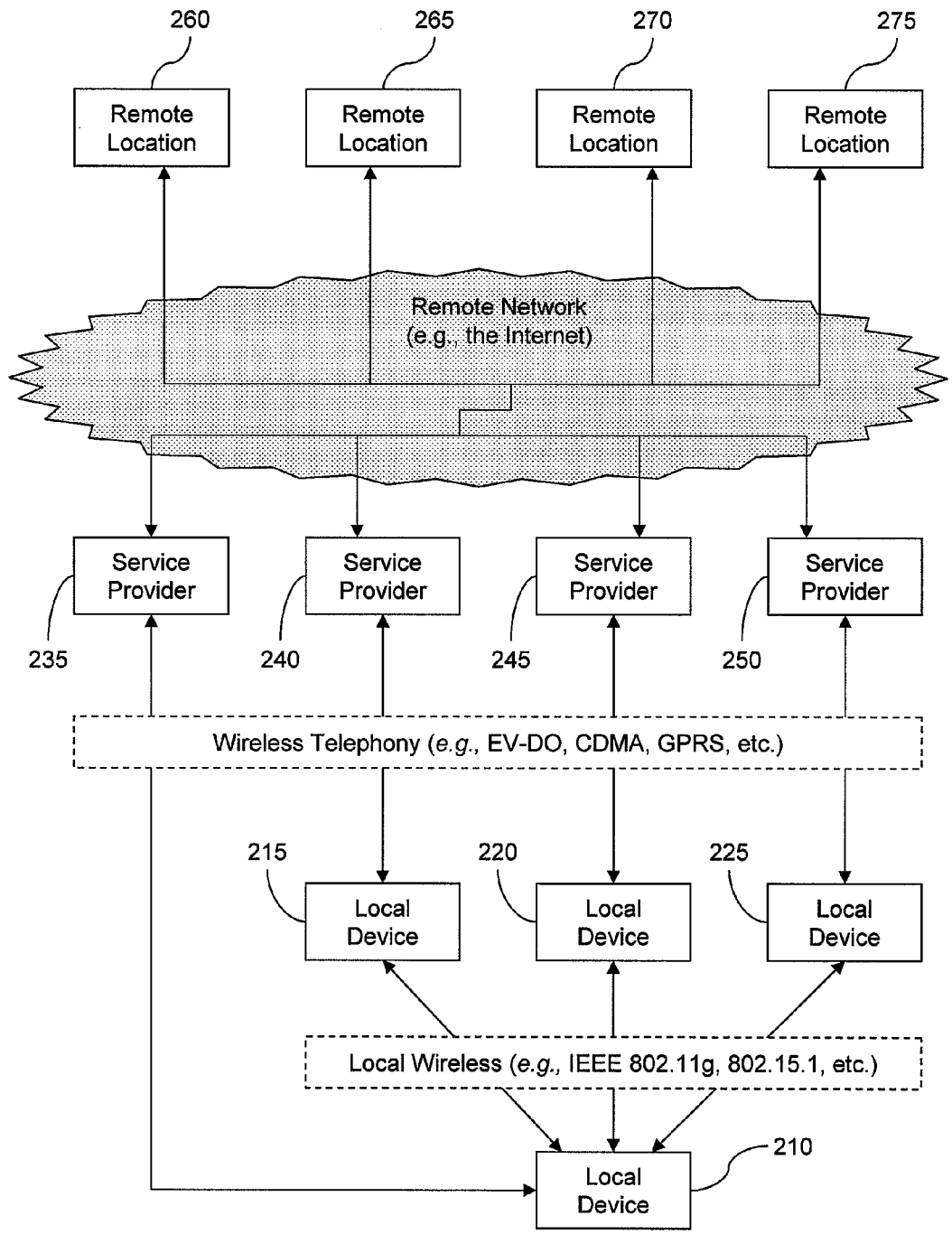

FIG. 2C is a more detailed overview of a non-gateway, peer-to-peer (P2P) bandwidth sharing architecture. In this implementation, a first node 210, second node 215, third node 220, and fourth node 225 each constitutes a respective wireless computing device such as, for example, a notebook computer, smart phone, personal digital assistant (PDA), etc. Each node 210, 215, 220, 225 has the ability to communicate (e.g., transfer data via known wireless protocols) with devices local to itself, as well as the ability to communicate with remote locations (e.g., the Internet) via an Internet Service Provider (ISP). Although four nodes are shown, any number of nodes can be used.

For example, the first node 210 may communicate with the second node 215 via any appropriate protocol, such as, for example, local wireless protocols IEEE 802.11a, 802.11b, 802.11g, IEEE 802.15.1 (i.e., Bluetooth®), IEEE 802.15.4 (e.g., Zigbee®), etc. Similarly, the first node 210 may communicate with each of the third and fourth nodes 220, 225, respectively, using any such protocol. In this manner, the first node 210 may transfer data (e.g., text file, word-processing document, spreadsheet, image file, multimedia file, etc.) to and/or from any one of the second, third, and fourth nodes 215, 220, 225.

The first node 210 may additionally communicate with a first ISP 235 via any appropriate wireless telephony (e.g., cellular) protocol, such as, for example, EV-DO, CDMA, EDGE, GPRS, etc. Similarly, second node 215 may communicate with a second ISP 240, third node 220 may communicate with a third ISP 245, and fourth node 225 may communicate with a fourth ISP 250 via any such wireless telephony protocol. The ISPs, in turn, provide connection to a remote network, such as the Internet. For example, the ISPs may provide connection to any number and type of remote locations 260, 265, 270, 275 on the Internet. Each remote location 260, 265, 270, 275 may comprise, for example, a computing device that is capable of storing data and transferring data to/from the various ISPs 235, 240, 245, 250, such as, for example, a desktop computer, server, etc., as shown in FIG. 1. In this manner, each node 210, 215, 220, and 225 may download and upload data from/to the Internet via their respective ISPs 235, 240, 245, 250. Although four ISPs and remote locations are shown, any number of ISPs and remote locations can be used. For example, two or more nodes may share a single ISP.

Still referring to the peer-to-peer implementations, the first node 210 is further provided with a peer-to-peer (P2P) networking capability, such as, for example, a torrent-type protocol such as BitTorrent® (registered trademark of BITTORRENT, INC. in the United States, other countries, or both). The P2P capability may be embodied in at least one of hardware, firmware, and software of the computing device of the first node 210. As is known to the skilled artisan, torrent-type P2P protocols allow a device to separately download portions of a desired file from any of various remote locations, and then re-assemble the portions into the desired file.

The first node 210 may utilize the bandwidth of the other nodes 215, 220, 225 to increase the rate of data transfer between itself and the Internet. This is accomplished by the first node 210 instructing each node 215, 220, 225 to download a respective portion of the file and transfer that portion to the first node 210. The first node 210 then assembles the portions into the desired file using the torrent-type protocol. In this manner, the first node 210 overcomes its limited "skinny pipe" connection to the Internet by creating a "virtual fat pipe" by employing the bandwidth of the other nodes 215, 220, 225.

Figure 2D:
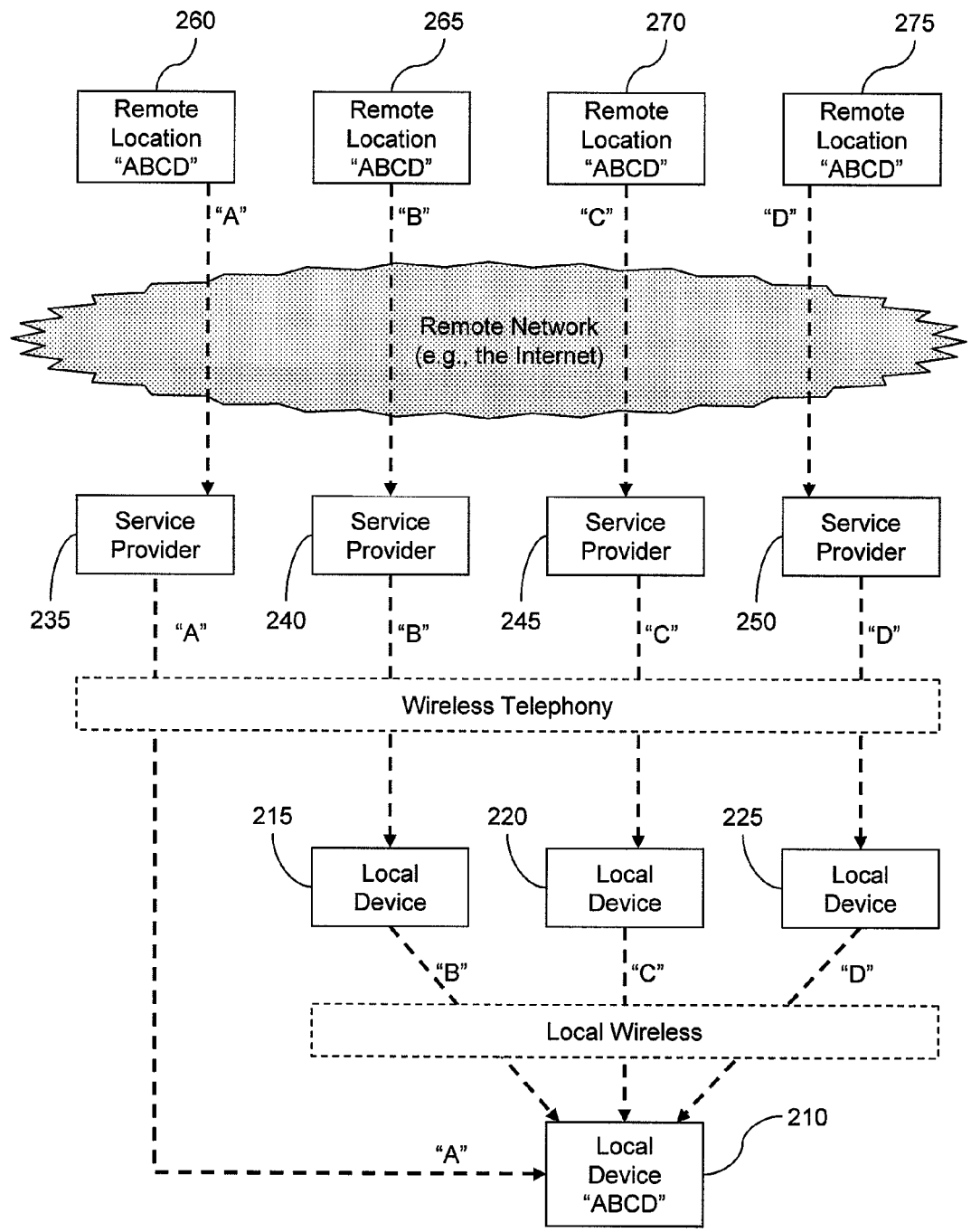

As depicted in FIG. 2D, a file made up of portions "ABCD" resides at each remote location 260, 265, 270, 275. The first node 210 downloads a first portion "A" of the file from the first remote location 260, the second node 215 downloads a second portion "B" from the second remote location 265, the third node 220 downloads a third portion "C" from the third remote location 270, and the fourth node 225 downloads a fourth portion "D" from the fourth remote location 275. The second, third, and fourth nodes transfer the respective portions to the first node, which reassembles the portions "A", "B", "C", "D" into the file "ABCD" using, for example, known torrent-type techniques.

As can be seen from the above-described example, the first node 210 uses the bandwidth of the other nodes 215, 220, 225 to effectuate a parallel, instead of serial, download of the file "ABCD". In this manner, such peer-to-peer ad hoc networks allow for faster downloading of the file to the first node 210.

To illustrate the improvement, assume file "ABCD" is 300 megabytes (MB) in size, and each node 210, 215, 220, 225 has a 1 megabit per second (Mbps) connection to its respective ISP. Further assume that the first node 210 has a 54 Mbps connection to each other node 215, 220, 225. In such a scenario, it would take about forty minutes for the first node 210 to download the file "ABCD" when acting alone. However, when the first node 210 utilizes the bandwidth of the other nodes 215, 220, 225, the download time in this example is reduced to about four minutes. It is noted that the number of nodes, ISPs, remote locations, and file portions described above are merely exemplary, and the peer-to-peer ad hoc network may be practiced with any appropriate number of nodes, ISPs, remote locations, and file portions.

Figure 3A:
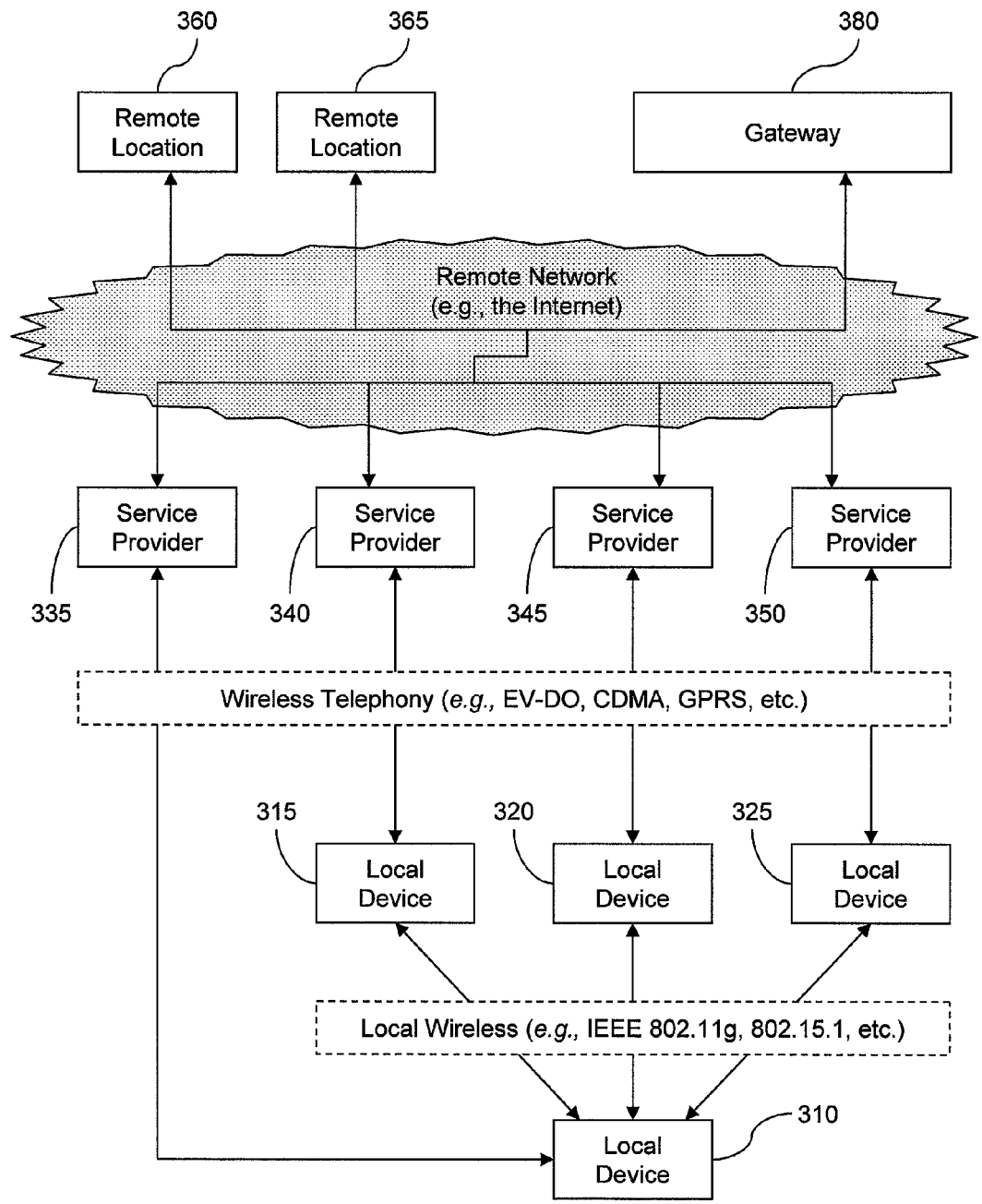
FIGS. 3A through 3C show gateway bandwidth-sharing ad hoc networks according to aspects of the invention.

FIG. 3A shows an overview of a gateway bandwidth sharing architecture that may be implemented according to systems and methods of the invention. In embodiments, a system comprises nodes 310, 315, 320, 325 and associated service providers (e.g., ISPs) 335, 340, 345, 350. Also shown is a first remote location 360 and a second remote location 365 of a remote network (e.g., the Internet). The nodes 310, 315, 320, 325, ISPs 335, 340, 345, 350, and remote locations 360, 365 are similar to those described above with respect to FIGS. 2A through 2D, such that the nodes may communicate with each other using local wireless protocols, the nodes may communicate with the ISPs using wireless telephony (e.g., cellular) protocols, and the ISPs may communicate with the remote locations over the remote network. The number of nodes, ISPs, and remote locations shown in FIG. 3A is merely exemplary, and any suitable number of nodes, ISPs, and remote locations may be used within the scope of the invention.

Also depicted in FIG. 3A is a gateway 380. In embodiments, the gateway 380 comprises any suitable computing device (such as, for example, that described with respect to FIG. 1) that is capable of data transfer with the ISPs 335, 340, 345, 350 and the remote locations 360, 365. For example, the gateway 380 may comprise a server that is connected to the ISPs 335, 340, 345, 350 and remote location 360, respectively, by a high speed connection (e.g., T3, cable, DSL, fiber, etc.). In implementations, the gateway 380 possesses a bandwidth that is equal to or greater than the collective bandwidth of the nodes 310, 315, 320, 325, such that the gateway can facilitate substantially parallel data transfer to the nodes.

In embodiments, the gateway 380 further comprises file splitting and joining functionality. That is, the gateway 380 may operate to split a single data file into multiple smaller files that can later be joined to re-create the original file. Such splitting and joining functionality may be embodied in any combination of hardware and software of the gateway 380 computing device, and is known such that it does not require further explanation here. Moreover, the splitting and joining functionality may be performed on any suitable type of data file, such as text files, audio files, video files, documents, spreadsheets, etc. The splitting of a file may be thought of as a type of multiplexing, and, hence, the gateway 380 may also be referred to as a multiplexed gateway and/or a gateway multiplexer. Furthermore, although the splitting (e.g., multiplexing) and joining (e.g., demultiplexing) described herein differs from the torrent-type techniques referred to with respect to FIGS. 2C and 2D, the gateway 380 may additionally comprise torrent-type functionality.

Figure 3B:
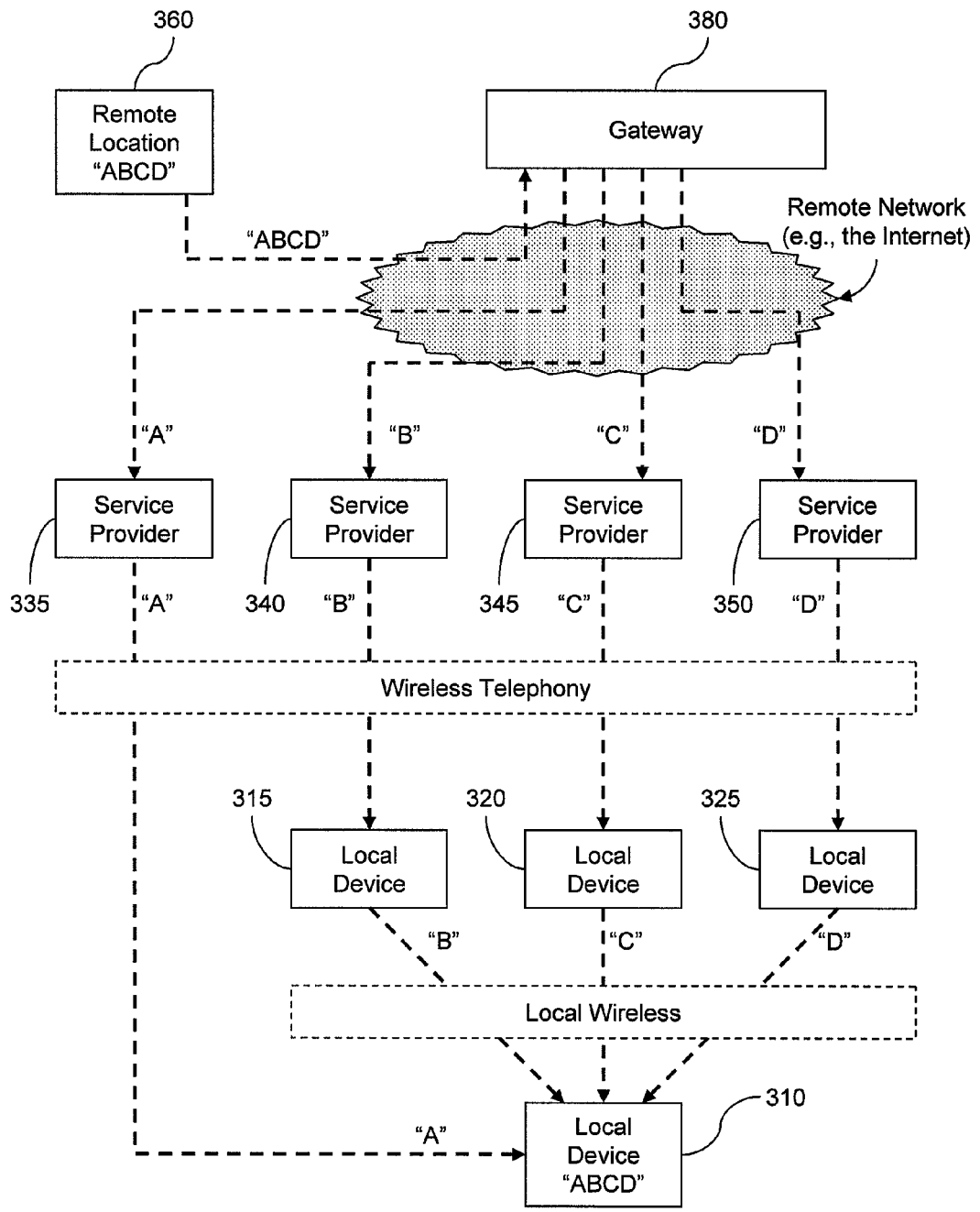

As depicted in FIG. 3B, a file made up of portions "ABCD" resides at remote location 360. The gateway 380 downloads the entire file "ABCD" from remote location 360 and splits the file into first portion "A", second portion "B", third portion "C", and fourth portion "D". The gateway sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions "A", "B", "C", "D" into the file "ABCD" using, for example, known file rejoining techniques.

As can be seen from the above-described example, the first node 310 uses the bandwidth of the other nodes 315, 320, 325 to effectuate a parallel, instead of serial, download of the file "ABCD". In this manner, the invention allows for faster downloading of the file to the first node 310.

To illustrate the improvement, assume file "ABCD" is 300 megabytes (MB) in size, and each node 310, 315, 320, 325 has a 1 megabit per second (Mbps) connection to its respective ISP. Further assume that the first node 310 has a 54 Mbps connection to each other node 315, 320, 325. In such a scenario, it would take about forty minutes for the first node 310 to download the file "ABCD" when acting alone. However, when the first node 310 utilizes the bandwidth of the other nodes 315, 320, 325 in accordance with the invention, the download time in this example is reduced to about four minutes. It is noted that the number of nodes, ISPs, remote locations, and file portions described above are merely exemplary, and the invention may be practiced with any appropriate number of nodes, ISPs, remote locations, and file portions.

Figure 3C:
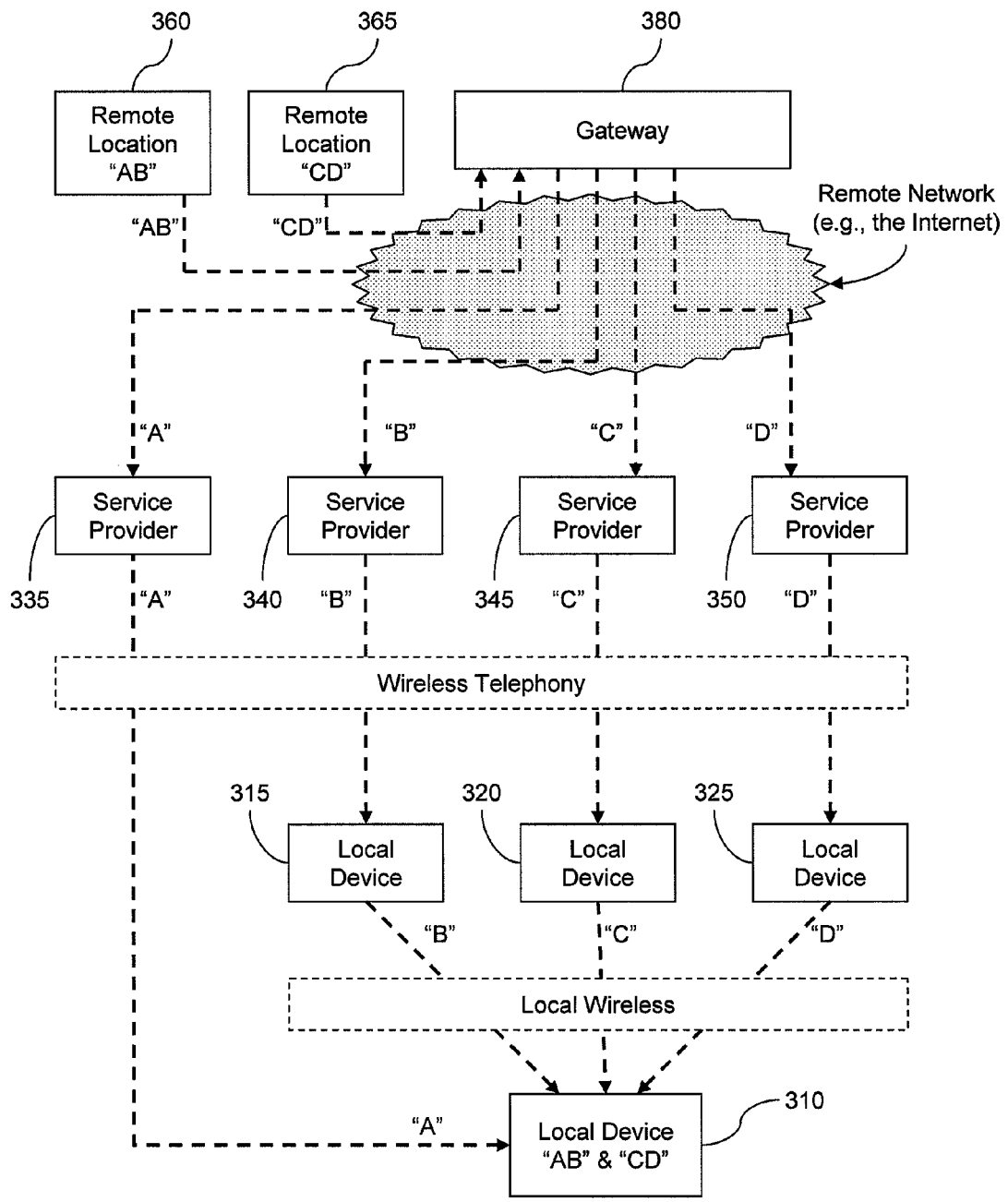

An even further embodiment is shown in FIG. 3C, in which plural files may be downloaded according to aspects of the invention. A first file "AB" resides at first remote location 360, and a second file "CD" resides at second remote location 365. The gateway 380 downloads the entire file "AB" from the first remote location 360 and the entire file "CD" from the second remote location. The gateway 380 splits the first file "AB" into portions "A" and "B", and splits the second file "CD" into portions "C" and "D". The gateway 380 sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions into files "AB" and "CD" using, for example, known file rejoining techniques.

Initial Formation of the Ad Hoc Network

In either the peer-to-peer or gateway environments described above, in order to form a new ad hoc network, a borrower may scan all available potential lenders and prioritize the potential lenders for a data transfer. The formation of the ad hoc network, in embodiments, may use a 'borrower/lender' table as shown in FIG. 4. In this example, the borrower or multiplexer will broadcast the table to potential lenders which, in turn, will return the table, with information pertinent to the lender, to the borrower or the multiplexer. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrow and lenders. For example, this could be a hostname, a Bluetooth® name or any other information that can uniquely describe the node. The "Node Type" column may describe whether this node is a borrow, a lender, or a multiplexer. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Processes Of The Invention

The steps of the flow diagrams described herein may be implemented in the environment of FIG. 1. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
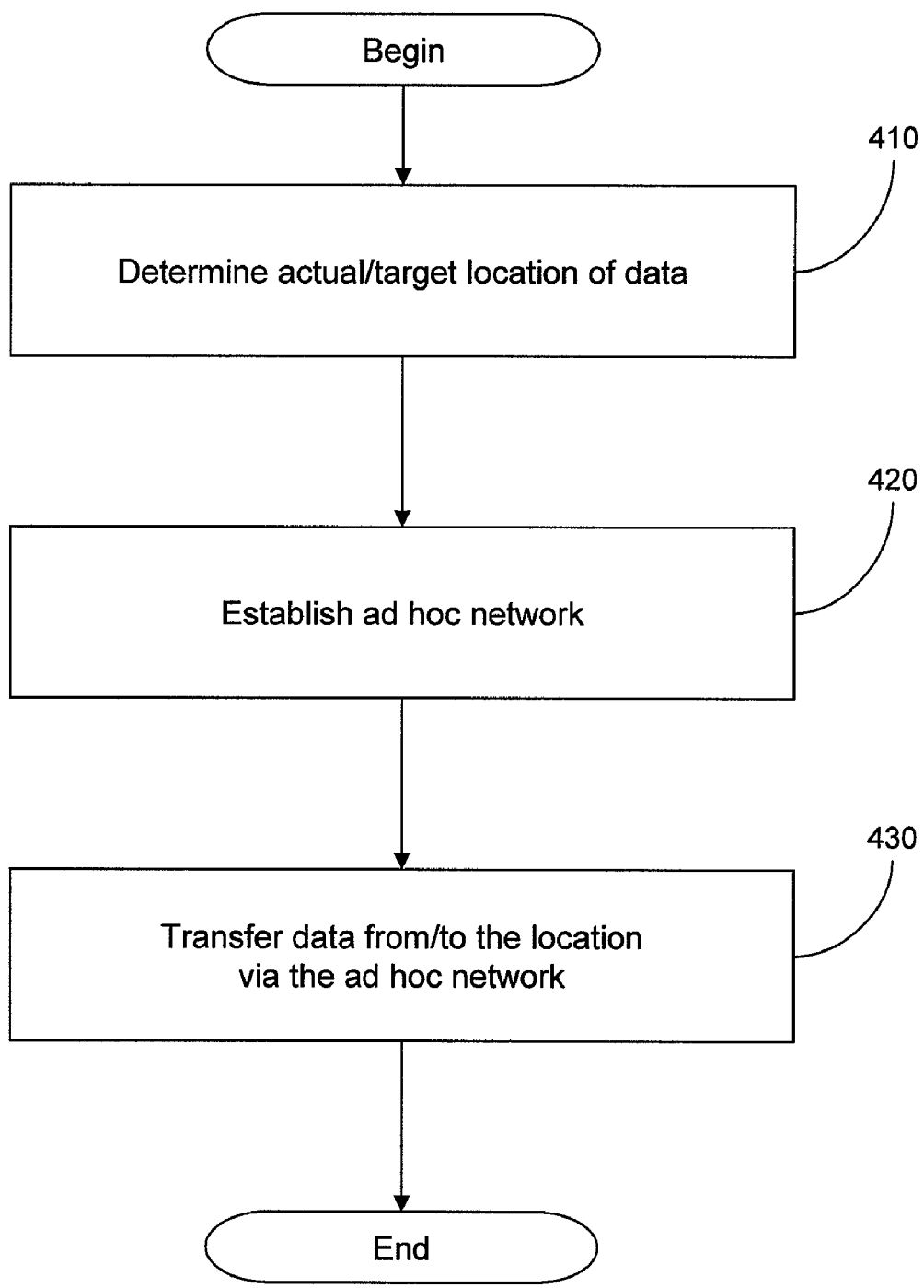
FIGS. 5-7 show flow diagrams depicting implementations of methods according to aspects of the invention.

FIG. 5 shows a flow diagram depicting steps of a first method for transferring data according to aspects of the invention. At step 410, a borrower determines a location of desired data on a remote network. In embodiments, the borrower is a node (e.g., comprises a wireless computing device that can communicate with other local devices and also with the remote network) as described above. The remote network may be, for instance, the Internet. The borrower determines the location of data in any suitable manner, such as, for example, a web search, P2P search, etc., as is known. The desired data may comprise, for example, a file that is stored at a remote location. The remote location may comprise any computing device that is capable of storing data and transferring data in the remote network, such as, for example, a desktop computer, server, etc.

At step 420, the borrower establishes an ad hoc network to facilitate enhanced downloading of the desired data. In embodiments, this is accomplished by the borrower communicating with a gateway and local nodes. For example, the borrower may query a gateway to determine if the gateway is available and can see the target file. This may be accomplished, for example, via communication between the borrower and the gateway through the borrower's ISP. In embodiments, both the borrower and gateway are provided with hardware and/or software for facilitating such communication.

Still referring to step 420, in implementations, the borrower also finds local nodes using a find utility that is comprised in any of the IEEE 802.11a, 802.11b, 802.11g, 802.15.1 (i.e., Bluetooth®), 802.15.4 (e.g., Zigbee®), etc., protocols. Such finding of other devices are known and further description is not believed necessary. The borrower may then ask the found nodes for assistance, which may comprise, for example, telling a found node the location of the multiplexed gateway, asking the found node if it can communicate with the multiplexed gateway, and asking the found node if it has excess bandwidth that can be utilized on behalf of the borrower. For example, step 420 may comprise the use of a borrower/lender table as described above with respect to FIG. 4. In embodiments, establishing the ad hoc network further comprises the borrower sending the identification of any lender or lenders to the multiplexed gateway. Illustrative cases of establishing the ad hoc network are set forth in co-pending application Ser. No. 11/755,775, and co-pending application Ser. No. 11/755,763. The establishment of the ad hoc network results in the identification of at least one of the found nodes that will act as a lender for the borrower.

At step 430, the desired data is transferred from the remote location to the borrower via the established ad hoc network. In embodiments, this comprises the gateway downloading the file from the remote location, splitting the file into various portions, and sending the respective portions to the lender or lenders via ISP(s). Each lender, in turn, forwards its respective portion to the borrower over a local wireless connection. The borrower, upon receipt of the file portions, rejoins the portions to re-create the original file. Illustrative cases of determining how many lenders to utilize and how to apportion the desired data amongst the lenders are set forth in co-pending application Ser. No. 11/755,802, and co-pending application Ser. No. 11/755,763.

In implementations, the method described above with respect to steps 410, 420, and 430 may similarly be used to upload data from the borrower to various remote locations. For example, the borrower may determine a target location, establish the ad hoc network, split the file into portions, transfer a respective portion of data to each lender, instruct each lender to upload its respective portion to a gateway, and instruct the gateway to re-join the file and upload the file to the target location.

The following are detailed examples of the general method that is described above with respect to FIG. 5.

Figure 6:
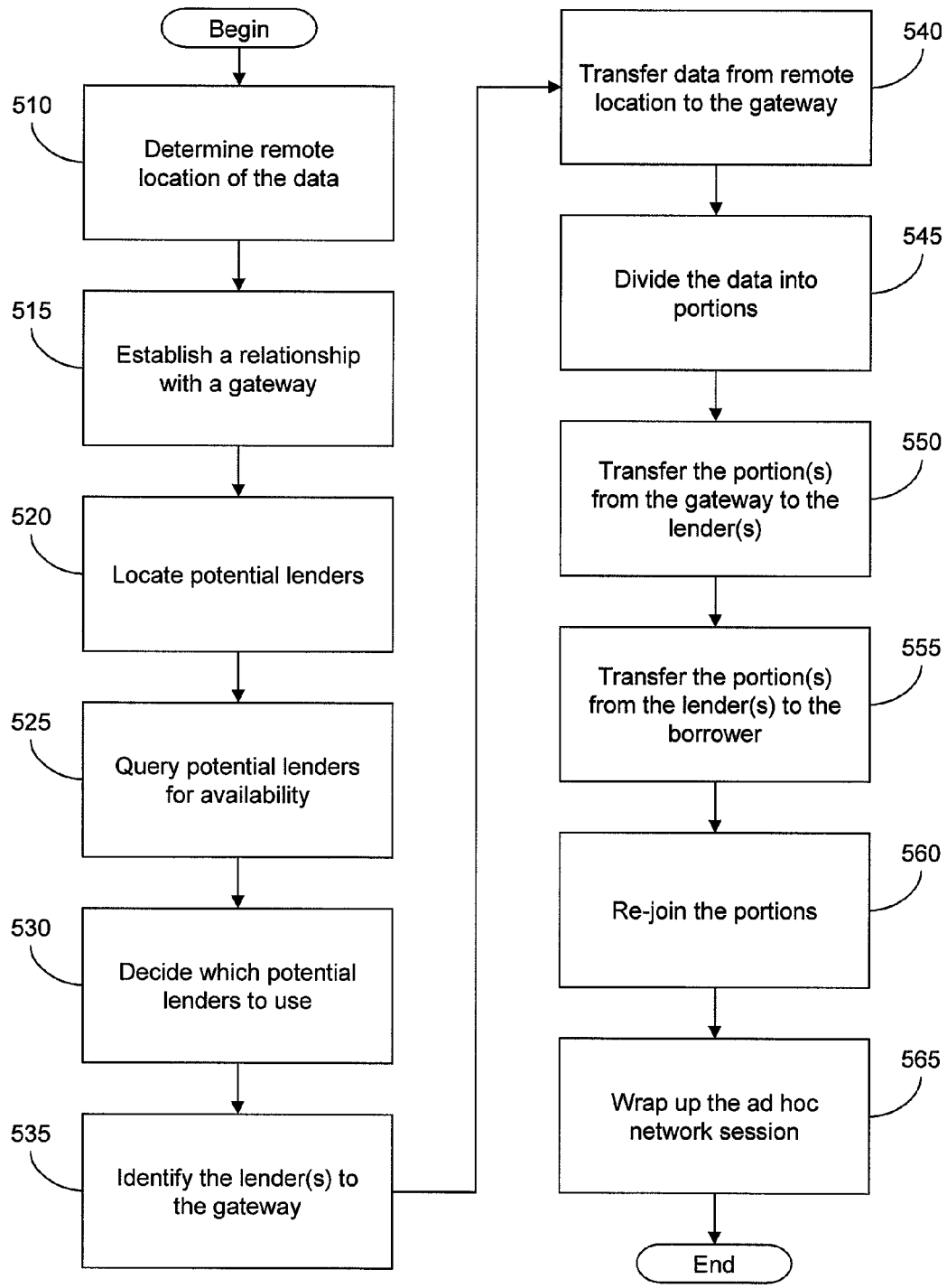

FIG. 6 shows a flow diagram depicting steps of a first implementation of a method for transferring data according to aspects of the invention. In this implementation, data is stored at a single location on the remote network (e.g., the Internet). At step 510, the borrower determines the location of the data on the remote network. In embodiments, this is accomplished in any suitable known fashion, such as, for example, web search, P2P network search, prior knowledge of IP address, etc.

At step 515, the borrower establishes a relationship with a gateway. In embodiments, this comprises locating an available gateway. For example, a borrower may locate a gateway by web search, P2P network search, prior knowledge of IP address, etc. Additionally or alternatively, a third party may offer a gateway, or list of gateways, that the borrower may access from the third party web site.

In implementations, once a borrower finds a gateway, the borrower queries the gateway for availability. For example, the borrower may send a message to the gateway with information such as: the location of the data, the size of the data, the type of data (e.g., mpeg, avi, etc.), the borrower's location, etc. The gateway, if it has sufficient bandwidth to accommodate the request, may send a return message to the borrower that it is available. If the gateway operates on a subscription, advertising, and/or fee basis, the gateway may also send subscription, advertising, and/or fee information to the borrower.

Still referring to step 515, if the gateway is not available for any reason (e.g., the gateway doesn't have enough bandwidth for the file size, the gateway cannot see the file, the gateway cannot split that type of file, the gateway does not transfer that type of data (e.g., unlicensed copyright-protected material, etc.)), then the borrower must locate another gateway. In embodiments, the unavailable gateway may divert or re-direct the borrower's request to another gateway that is available. Alternatively, the borrower may search for another gateway using the above described search techniques.

After a relationship between the borrower and gateway is established, the borrower locates potential lenders within its local wireless range at step 520. In embodiments, this is accomplished by the borrower using a known find utility to locate other wireless devices that it can communicate with using local wireless protocols, such as, for example, IEEE 802.11a, 802.11b, 802.11g, 802.15.1, 802.15.4, etc.

At step 525, the borrower queries the found local devices (e.g., potential lenders) for availability of lending bandwidth. In embodiments, this comprises the borrower broadcasting the location of the gateway and a request for bandwidth to the potential lenders using the local wireless protocol. Each interested potential lender determines if it can communicate with (e.g., see) the gateway through its ISP, and if it has bandwidth to spare (e.g., lend to the borrower). Each interested potential lender responds to borrower with a report of its available bandwidth. In implementations, if a lender is selling bandwidth, then it may also provide the borrower with a price of the bandwidth that is being offered. Illustrative cases of establishing the ad hoc network and pricing are set forth in co-pending application Ser. No. 11/755,775.

Still referring to step 525, in embodiments, a potential lender may selectively deny lending bandwidth based upon any number of factors, including, for example, the type of data to be downloaded (unlicensed copyright protected material, etc.), the borrower making the request, etc. For example, if a potential lender decides to deny lending bandwidth, the lender may respond to the borrower with a denial and an explanation of the denial, or the potential lender may simply not respond to the borrower at all.

At step 530, upon receipt of the above-described information from the potential lenders, the borrower decides which of the potential lenders to use and how to use the lenders. In embodiments, this involves a first tier optimization based upon factors such as, for example, how many potential lenders are available, the available bandwidth of each potential lender, the price of each potential lender, and the reliability (indicated by past performance) of each potential lender. In implementations, the borrower may comprise a component (e.g., at least one of hardware, software, etc.) that determines an optimal lender solution based upon the received potential lender information and predetermined parameters, such as, for example, price, speed, reliability, etc. The lender solution may comprise, for example, a determination of which potential lenders to use and how to apportion the data amongst them. Even further, such a component (e.g., at least one of hardware, software, etc.) may allow a user to designate (by, for example, numeric entry, sliding scale, etc.) values for the relative importance of price, speed, and reliability, which values would influence the determination of an optimal lender solution based upon returned potential lender information.

At step 535, the borrower identifies the lenders to the gateway. In embodiments, if the borrower performed an optimization and chose lenders on its own, then the borrower may simply send its lender solution to the gateway. Alternatively, the borrower may send all of the potential lender information to the gateway, along with any of the borrower's parameters, and allow the gateway to perform the optimization to determine a lender solution. In further implementations, when the borrower allows the gateway to determine the lender solution, the gateway sends the proposed lender solution back to the borrower for acceptance.

After the borrower sends a lender solution to the gateway, or accepts a gateway-determined lender solution, the gateway downloads the data at step 540. This is accomplished in any suitable known manner, preferably by way of a high speed connection (e.g., T3, cable, fiber optic, etc.) between the gateway and the remote location.

At step 545, the gateway divides the file into portions for each respective lender based upon the lender solution. In embodiments, this is accomplished using any known suitable file splitting hardware and/or software. For example, there are known hardware and/or software techniques for splitting numerous types of files, including, but not limited to: jpg, jpeg, png, gif, bmp, txt, wmv, avi, pdf, doc, xls, ppt, mpeg, mov, rm, rmvb, wav, vcd, svcd, dvd, etc. The portions need not be of equal size, and illustrative cases of optimizing portion size based upon lender information are set forth in co-pending application Ser. No. 11/755,763.

At step 550, the gateway sends the respective portions to the lender or lenders via each lender's ISP. If the borrower is to receive a portion based upon the lender solution, then the gateway also sends a respective portion to the borrower. In embodiments, all of the portions are sent as close to simultaneously as possible, such that the borrower gains the benefit of parallel downloading.

Step 550 may further comprise the gateway sending periodic status updates to the borrower. For example, the gateway may send a 'percentage complete' status to the borrower based upon the ratio of data sent to the lenders compared to the total amount of data.

Step 550 may further comprise the gateway monitoring lender performance. For example, a data portion that is bounced back to the gateway from a lender may be an indication that the lender is not receiving the data. In such situations, the gateway may resend the data to the lender or re-apportion the data amongst the other lenders.

At step 555, each lender transmits its respective portion to the borrower using any suitable local wireless communication protocol. It is noted that a particular lender need not wait for all other lenders to receive their portions before transmitting to the borrower. For example, a lender may send its data to the borrower as soon as it has completely received its portion from the gateway. Moreover, a lender need not wait until it has completely received its portion from the gateway to begin transmitting to the borrower. That is, a lender may transmit the data as it comes in, essentially acting as a conduit for the data from the gateway to the borrower.

In implementations, the borrower may monitor the transmissions from the lenders. For example, if the borrower is expecting data from a lender based upon the gateway status report, the borrower may monitor the amount of data received from each lender. If any lender is underperforming, then the borrower may re-calculate and send a new lender solution to the gateway, thereby re-apportioning the data to avoid the problematic lender. Alternatively, the borrower may report the problematic lender to the gateway, and let the gateway re-calculate the lender solution and re-apportion the data accordingly. Even further, the borrower may attempt to locate and enlist another lender or lenders.

At step 560, the borrower rejoins the received file portions to re-create the data. Similar to the dividing at step 545, this may be accomplished using any suitable hardware and/or software utility.

At step 565, the borrower wraps up the ad hoc network session. In embodiments, this comprises the borrower sending a message to the gateway and each lender that the download is complete and that their services are no longer needed. This may further comprise the borrower rendering payment, either directly or indirectly, to any lender, gateway, service provider, etc.

Figure 7:
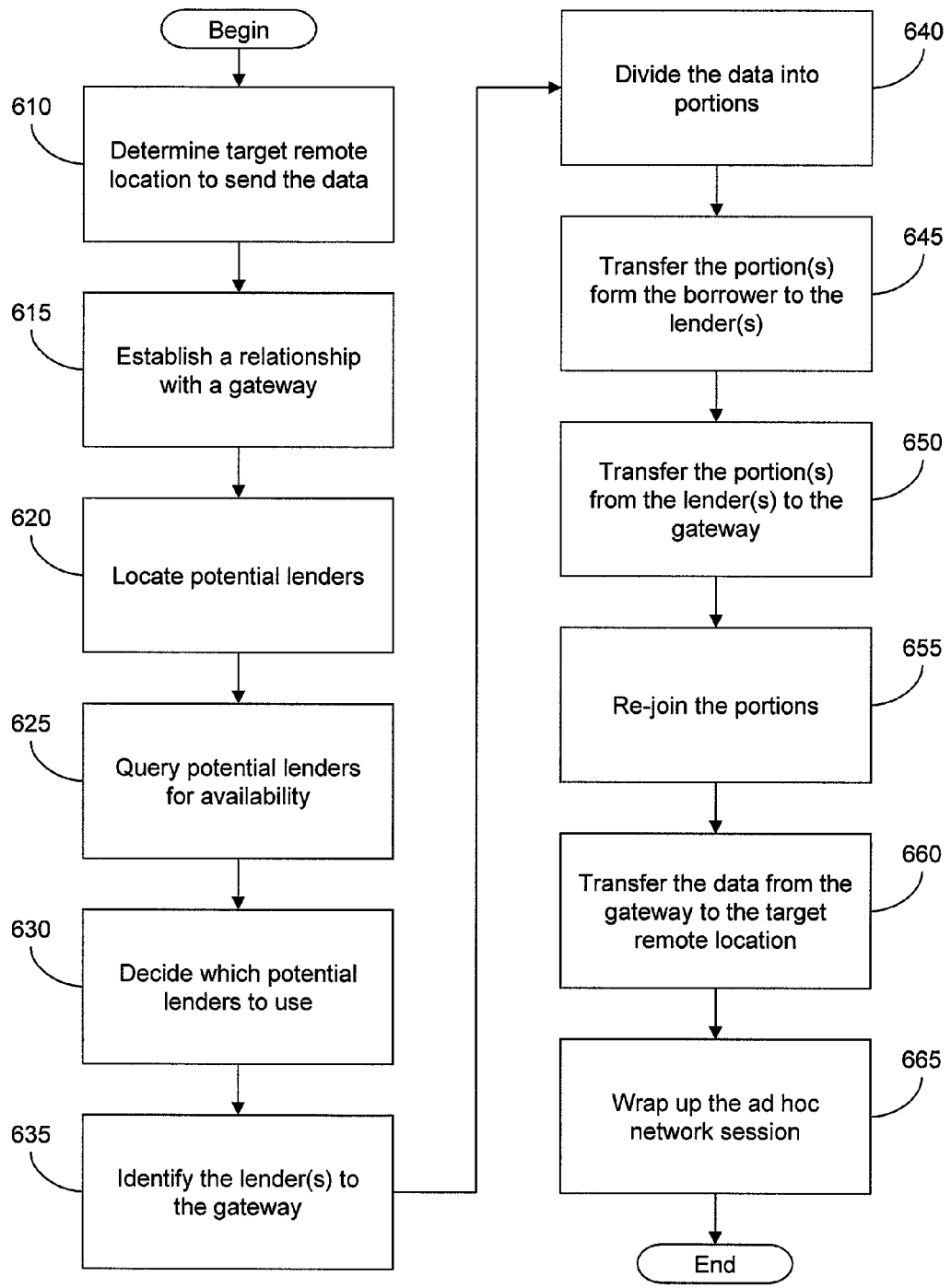

FIG. 7 shows a flow diagram depicting steps of a second implementation of a method for transferring data according to aspects of the invention. In this implementation, instead of downloading data, the borrower is uploading data to a location or locations on a remote network. At step 610, the borrower determines the target locations on the remote network. This may be accomplished in any suitable known manner, such as, for example, via web search, P2P network search, prior knowledge of IP address, etc.

At step 615, the borrower establishes a relationship with a gateway. At step 620, the borrower locates potential lenders within its local wireless range. At step 625, the borrower queries the potential lenders for availability. At step 630, the borrower decides which potential lenders to use. At step 635, the borrower identifies the lender or lenders to the gateway. In embodiments, steps 615 through 635 may be performed in a manner similar to steps 515 through 535 described above with respect to FIG. 6.

At step 640, the borrower divides the data into portions for each respective lender based upon the lender solution. In embodiments, this is accomplished using any known suitable file splitting hardware and/or software. For example, there are known hardware and/or software techniques for splitting numerous types of files, including, but not limited to: jpg, jpeg, png, gif, bmp, txt, wmv, avi, pdf, doc, xls, ppt, mpeg, mov, rm, rmvb, wav, vcd, svcd, dvd, etc.

At step 645, the borrower transfers the portion(s) to the lender(s) using any suitable local wireless protocol. In implementations, the data transfer from the borrower to a lender may also include an instruction to the lender to send the data portion to the gateway, as well as an identification of the gateway (e.g., IP address). At step 650, the lender or lenders transfer the portions to the gateway. Additionally, the borrower may also transfer a portion to the gateway. In embodiments, these transfers to the gateway are sent through the borrower's and lenders' respective ISPs, and are preferably performed as close to simultaneously as possible to effectuate a substantially parallel data transfer.

In embodiments, step 650 may further comprise the gateway sending periodic status updates to the borrower. For example, the gateway may monitor the progress (e.g., transfer of the data portion) of each lender, and send a 'percentage complete' status message to the borrower.

In embodiments, step 650 may further comprise the gateway monitoring the progress of each lender and reporting any problematic (e.g., underperforming) lender to the borrower. In such situations, the borrower may take action, such as, for example, re-apportion the data to other lenders, find new lenders to use, etc.

At step 655, the gateway rejoins the data portions. Similar to step 560 described above, this may be accomplished using any suitable known technique for rejoining the data portions. Step 655 may further include the gateway sending a message to the borrower that all of the portions have been successfully received.

At step 660, the gateway transfers the data to the target remote location. It is noted that the borrower may specify more than one target remote location for the gateway to send the target data to, such that the gateway transfers the data to plural remote locations. Step 660 may further comprise the gateway sending a message to the borrower that the data has been sent to the target remote locations.

At step 665, the borrower wraps up the ad hoc network session. In embodiments, this comprises the borrower sending a message to the gateway and each lender that the data transfer is complete and that their services are no longer needed. Step 665 may further comprise the borrower rendering payment, either directly or indirectly, to any lender, gateway, service provider, etc.

In embodiments of the invention, each device of an ad hoc network comprises hardware and/or software that performs some or all of the functions described herein. For example, a wireless device may download and install a software application that allows the wireless device to perform at least one of: establish a relationship with a gateway, broadcast requests for borrowing bandwidth, respond to requests for borrowing bandwidth, generate a borrower/lender table, determine lender solutions, etc. Such software may, for example, be created by and available for download from a service provider.

In any of the examples and implementations described above, the lending of bandwidth may be performed for free or based upon some form of payment, either directly or indirectly, from the borrower to the lender. If payment methods are used, fixed-price payment policies may be established based upon factors such as: volume of data transferred by a lender for a borrower, amount of time a lender is transferring data for a borrower, etc.

Moreover, variable price payment policies may be established as an alternative to the above-described fixed-price payment policies. For example, a price may be negotiated between a borrower and lender.

Additionally or alternatively, in any of the examples and implementations described above, a borrower's ability to borrow bandwidth from lenders may be subject to fair sharing strategies. For example, a points system may be implemented where a borrower must have sufficient points in an account to be able to borrow bandwidth from a lender. Borrowers may obtain points by acting as lenders for other borrowers, or by purchasing points from a service provider.

While the invention has been described in terms of embodiments, those skilled in the art will recognize that the invention can be practiced with modifications and in the spirit and scope of the appended claims. For example, while the embodiments have been described with one, two, or three lenders, those skilled in the art will recognize that the invention can be practiced with any number of lenders, files, file portions, ISPs, and/or remote locations.

What is claimed:

1. A method, comprising:
    establishing a relationship with a gateway that retrieves data from a remote location and divides the data into at least a first portion and a second portion;
    establishing an ad hoc network comprising at least one local lender;
    receiving the first portion from the gateway via the at least one local lender;
    receiving the second portion from the gateway;
    joining the first portion and the second portion to re-create the data;
    the gateway receiving lender information from a borrower, the lender information including: availability of each of a plurality of potential lenders, available bandwidth of each of the plurality of potential lenders, price of each of the plurality of potential lenders, and reliability of each of the plurality of potential lenders;

the gateway determining, based on the lender information, one or more of the plurality of potential lenders to be used in the ad hoc network; and the gateway apportioning, based on the lender information, the data file amongst the one or more of the plurality of potential lenders to be used in the ad hoc network.

2. The method of claim 1, wherein the receiving the second portion from the gateway comprises receiving the second portion from the gateway via a second local lender of the ad hoc network.

3. The method of claim 1, wherein the at least one local lender comprises a wireless computing device.

4. The method of claim 3, wherein:
the first portion is transferred from the gateway to the at least one local lender via wireless telephony communication, and
the receiving the first portion from the gateway via the at least one local lender comprises receiving the first portion via local wireless communication.

5. The method of claim 1, wherein the establishing an ad hoc network comprises locating the plurality of potential lenders.

6. The method of claim 5, wherein the establishing an ad hoc network comprises querying the plurality of potential lenders for availability of lending bandwidth.

7. The method of claim 6, wherein the establishing an ad hoc network comprises choosing the at least one local lender from the plurality of potential lenders.

8. The method of claim 1, wherein the steps of claim 1 are provided by a service provider under a subscription and/or fee agreement and/or based on advertising content to one or more third parties.

9. The method of claim 1, wherein a service provider at least one of creates, maintains, deploys and supports a computer infrastructure that performs the steps of claim 1.

10. A method, comprising:
receiving a remote location for a data file;
receiving an identity of at least one lender;
downloading an entirety of the data file from the remote location;
after the downloading, dividing the data file into at least a first portion and a second portion;
transferring the first portion and the second portion separately to a borrower of an ad hoc network;
the gateway device receiving lender information from the borrower, the lender information including: availability of each of the plurality of potential lenders, available bandwidth of each of the plurality of potential lenders, price of each of the plurality of potential lenders, and reliability of each of the plurality of potential lenders;
the gateway device determining, based on the lender information, one or more of the plurality of potential lenders to be used in the ad hoc network; and
the gateway device apportioning, based on the lender information, the data file amongst the one or more of the plurality of potential lenders to be used in the ad hoc network,
wherein the receiving the remote location for the data file comprises a gateway device receiving the remote location for the data file from the borrower;
the receiving the identity of at least one lender comprises the gateway device receiving an identity of a plurality of potential lenders from the borrower; and the gateway device performs the downloading, the dividing, and the transferring.

11. A method, comprising:
providing a computer infrastructure operable to:
establish a relationship with a gateway device;
establish an ad hoc network amongst local devices; and
receive a data file from a remote location via the gateway device and the local devices, or transmit a data file to a remote location via the local devices and the gateway device,
the gateway device receiving lender information from a borrower, the lender information including: availability of each of a plurality of potential lenders, available bandwidth of each of the plurality of potential lenders, price of each of the plurality of potential lenders, and reliability of each of the plurality of potential lenders;
the gateway device determining, based on the lender information, one or more of the plurality of potential lenders to be used in the ad hoc network; and
the gateway device apportioning, based on the lender information, the data file amongst the one or more of the plurality of potential lenders to be used in the ad hoc network.

12. The method of claim 11, wherein the establishing an ad hoc network comprises locating the plurality of potential lenders.

13. The method of claim 12, wherein the establishing an ad hoc network further comprises querying the plurality of potential lenders for availability of lending bandwidth.

14. The method of claim 13, wherein the establishing an ad hoc network further comprises choosing the local devices from the plurality of potential lenders.

15. The method of claim 13, wherein the receiving the data file from the remote location comprises:
receiving a first portion of the data file from a first one of the local devices;
receiving a second portion of the data file from either the gateway device or a second one of the local devices; and
joining the first portion and the second portion to recreate the data file.

16. The method of claim 13, wherein the transmitting the data file to the remote location comprises:
dividing the data file into a first portion and a second portion;
transferring the first portion to a first one of the local devices; and
transferring the second portion to either the gateway device or a second one of the local devices.

17. The method of claim 13, wherein the steps of claim 16 are provided by a service provider under a subscription and/or fee agreement and/or based on advertising content to one or more third parties.

18. The method of claim 13, wherein a service provider at least one of creates, maintains, deploys and supports a computer infrastructure that performs the steps of claim 16.

19. The method of claim 13, further comprising sending identities of the local devices to the gateway device.

20. A computer program product comprising a computer usable non-transitory storage medium having a computer readable program embodied in the medium, wherein the computer readable program when executed on a computing device causes the computing device to:
establish a relationship between a borrower and a gateway device;
establish an ad hoc network amongst local devices; and receive a data file from a remote location via the gateway device and the local devices, or transmit a data file to a remote location via the local devices and the gateway device, the gateway device receiving lender information from the borrower, the lender information including: availability of each of a plurality of potential lenders, available bandwidth of each of the plurality of potential lenders, price of each of the plurality of potential lenders, and reliability of each of the plurality of potential lenders;

the gateway device determining, based on the lender information, one or more of the plurality of potential lenders to be used in the ad hoc network; and the gateway device apportioning, based on the lender information, the data file amongst the one or more of the plurality of potential lenders to be used in the ad hoc network.

21. The computer program product of claim 20, wherein the receiving a data file comprises:

receiving a first portion of the data file from a first one of the local devices;

receiving a second portion of the data file from either the gateway device or a second one of the local devices; and joining the first portion and the second portion to recreate the data file.

22. The computer program product of claim 20, wherein the transmitting the data file comprises:

the borrower dividing the data file into a first portion and a second portion;

the borrower transferring the first portion to a first one of the local devices; and the borrower transferring the second portion to either the gateway device or a second one of the local devices.

23. A system comprising a server having a database containing data associated with one or more lenders and a borrower in an ad-hoc network, and at least one of a hardware and software component configured to: establish a relationship between the borrower and a gateway device; establish an ad hoc network amongst the borrower and the one or more lenders; and one of receive a data file from a remote location via the gateway device and the one or more lenders, and transmit a data file to a remote location via the one or more lenders and the gateway device, wherein the at least one of a hardware and software component comprises a processor, the gateway device receiving lender information from the borrower, the lender information including: availability of each of a plurality of potential lenders, available bandwidth of each of the plurality of potential lenders, price of each of the plurality of potential lenders, and reliability of each of the plurality of potential lenders;

the gateway device determining, based on the lender information, one or more of the plurality of potential lenders to be used in the ad hoc network; and the gateway device apportioning, based on the lender information, the data file amongst the one or more of the plurality of potential lenders to be used in the ad hoc network.

24. The system of claim 23, wherein the at least one of a hardware and software component is configured to: receive a first portion of the data file from a first one of the local devices; receive a second portion of the data file from either the gateway device or a second one of the local devices; and join the first portion and the second portion to recreate the data file.

25. The system of claim 23, wherein the at least one of a hardware and software component is configured to: divide the data file into a first portion and a second portion; transfer the first portion to a first one of the one or more lenders; and transfer the second portion to either the gateway device or a second one of the one or more lenders.

26. The system of claim 23, wherein a service provider at least one of creates, maintains, deploys and supports the at least one of a hardware and software component.

27. The system of claim 23, wherein the at least one of a hardware and software component resides on a server provided by a service provider.

28. The method of claim 10, further comprising: the gateway device sending to the borrower a status message related to the transferring; monitoring a status of the ad hoc network; and the gateway device re-apportioning the data file amongst members of the ad hoc network based on the monitoring.

* * * * *